(12) United States Patent
Narahara

(10) Patent No.: US 11,760,476 B2
(45) Date of Patent: Sep. 19, 2023

(54) AIRCRAFT FLIGHT CONTROL METHOD

(71) Applicant: Yutaka Narahara, Sagamihara (JP)

(72) Inventor: Yutaka Narahara, Sagamihara (JP)

( * ) Notice: Subject to any disclaimer, the term of this patent is extended or adjusted under 35 U.S.C. 154(b) by 526 days.

(21) Appl. No.: 17/042,508

(22) PCT Filed: Mar. 29, 2018

(86) PCT No.: PCT/JP2018/013317
§ 371 (c)(1),
(2) Date: Nov. 13, 2020

(87) PCT Pub. No.: WO2019/186918
PCT Pub. Date: Oct. 3, 2019

(65) Prior Publication Data
US 2023/0159162 A1    May 25, 2023

(51) Int. Cl.
*B64C 33/02* (2006.01)
*B64C 29/00* (2006.01)
*B64C 3/40* (2006.01)
(Continued)

(52) U.S. Cl.
CPC ............ *B64C 33/025* (2013.01); *B64C 3/385* (2013.01); *B64C 3/40* (2013.01); *B64C 29/0033* (2013.01); *B64U 10/40* (2023.01)

(58) Field of Classification Search
CPC ....... B64C 33/00; B64C 33/02; B64C 33/025; B64C 3/385; B64C 3/40; B64C 3/38; B64U 10/40
See application file for complete search history.

(56) References Cited

U.S. PATENT DOCUMENTS

| 997,521 | A | * | 7/1911 | Travis | B64C 33/02 244/22 |
| 1,694,602 | A | * | 12/1928 | Nuttall | B64C 33/02 244/70 |

(Continued)

FOREIGN PATENT DOCUMENTS

FR        419 308        1/1911
JP    2005-297825 A    10/2005
(Continued)

OTHER PUBLICATIONS

Extended European Search Report for European Application No. 18911427.5 dated Oct. 12, 2021.

*Primary Examiner* — Tien Q Dinh
*Assistant Examiner* — William L Gmoser
(74) *Attorney, Agent, or Firm* — Muncy, Geissler, Olds & Lowe , P.C.

(57) ABSTRACT

A method for realizing a vertical take-off and landing aircraft that does not use a mechanism dedicated for take-off and landing, which cannot be achieved on the basis of an existing concept of aircraft flight control, by introducing a new concept of a shoulder rotational axis and an arm rotational axis into aircraft flight control and controlling vertical take-off and landing and ordinary flight with the same mechanism. This instruction eliminates a necessity of a tail and ailerons from an airframe of the aircraft, enables reduction of manufacturing, maintenance, and running costs thereof, and makes it possible to avoid problems of maneuverability and cruising distance performance of airframes of vertical take-off and landing aircrafts.

2 Claims, 17 Drawing Sheets

(51) Int. Cl.
*B64C 3/38* (2006.01)
*B64U 10/40* (2023.01)

(56) References Cited

U.S. PATENT DOCUMENTS

| | | | | | |
|---|---|---|---|---|---|
| 1,834,465 | A | * | 12/1931 | Lowman | B64C 33/02 244/46 |
| 1,980,002 | A | * | 11/1934 | Savidge | B64C 33/00 244/11 |
| 2,021,627 | A | * | 11/1935 | Gilpin | B64C 33/02 244/22 |
| 2,218,599 | A | * | 10/1940 | Brunner | B64C 33/02 244/72 |
| 4,793,573 | A | * | 12/1988 | Kelfer | B64C 33/02 244/22 |
| 6,659,397 | B1 | * | 12/2003 | Charron | B64C 33/02 244/76 R |
| 6,783,097 | B1 | * | 8/2004 | Smith | B64C 33/02 244/22 |
| 2005/0230531 | A1 | | 10/2005 | Horimouchi | |
| 2013/0206915 | A1 | | 8/2013 | Desaulniers | |
| 2017/0283052 | A1 | | 10/2017 | Moshe | |
| 2017/0369162 | A1 | | 12/2017 | Alzahram | |
| 2018/0086442 | A1 | | 3/2018 | Regev | |
| 2019/0084673 | A1 | | 3/2019 | Chen et al. | |
| 2021/0009269 | A1 | | 1/2021 | Chen et al. | |

FOREIGN PATENT DOCUMENTS

| | | |
|---|---|---|
| JP | 2007-253946 A | 10/2007 |
| JP | 2018-020742 A | 2/2018 |
| WO | WO 2011/131733 A2 | 10/2011 |
| WO | WO 2016/035068 A2 | 3/2016 |
| WO | WO 2017/131834 A2 | 8/2017 |
| WO | WO 2017/205997 A1 | 12/2017 |

* cited by examiner

AIRCRAFT FLIGHT CONTROL METHOD

TECHNICAL FIELD

The present invention relates to an aircraft flight control method.

BACKGROUND ART

Currently, aircrafts capable of performing vertical take-off and landing are practically used.

However, since functions of the vertical take-off and landing are realized by including mechanisms dedicated for vertical take-off and landing, there is a problem that structures thereof are more complicated and heavier than those of airframes of ordinary take-off landing-type aircrafts.

There are problems that the mechanisms for vertical take-off and landing do not function at the time of ordinary flight, that tails thereof do not function at the time of vertical take-off and landing, and that heavy parts that do not contribute to flight are thus constantly included in the airframe.

Also, since the airframes are adapted to perform flight control using different mechanisms at the time of vertical take-off and landing and at the time of ordinary flight, it is necessary to learn these two control methods in order to cause the airframes to fly.

For these reasons, the airframes of vertical take-off and landing aircrafts cannot avoid a problem that mobility and cruising distance performance thereof are inferior to those of an ordinary take-off and landing type regardless of an increase in manufacturing, maintaining, and running costs as compared with the ordinary take-off and landing aircrafts.

SUMMARY OF INVENTION

Technical Problem

A problem to be solved is that current vertical take-off and landing aircrafts need two mechanisms and two different types of control for vertical take-off and landing and for ordinary flight.

Solution to Problem

The present invention is characterized by controlling vertical take-off and landing and ordinary flight using the same mechanism by introducing concepts of a shoulder rotational axis and an arm rotational axis into aircraft flight control.

Advantageous Effects of Invention

An aircraft that employs the flight control method according to the present invention has an advantage that since the aircraft does not have a mechanism and control dedicated for vertical take-off and landing even if the aircraft is a vertical take-off and landing aircraft, the aircraft has a simpler structure and can be manipulated by the same method as that of an ordinary take-off and landing aircraft that employs the present invention.

DESCRIPTION OF EMBODIMENTS

Hereinafter, three embodiments will be described.

First Embodiment

FIGS. 1 to 14 illustrate an aircraft of an ordinary take-off and landing type that performs flight control by the method of the present invention.

Figure 1:
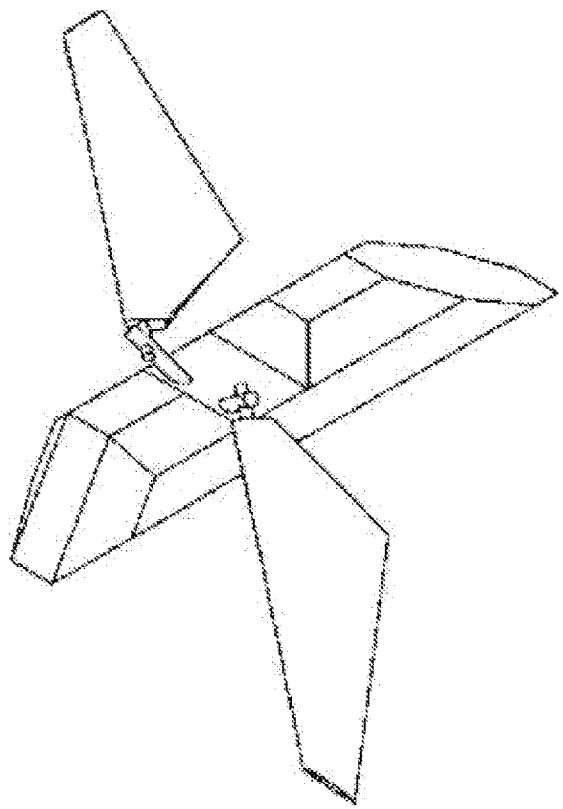
FIG. 1 is a perspective view of airframe coordinates of an airframe obtained by causing a shoulder rotational axis 2 on the left side to rotate to 55°, causing a shoulder rotational axis on the right side thereof to rotate to −35°, and causing both arm rotational axes 3 to rotate to 30° (first embodiment).
Figure 2:
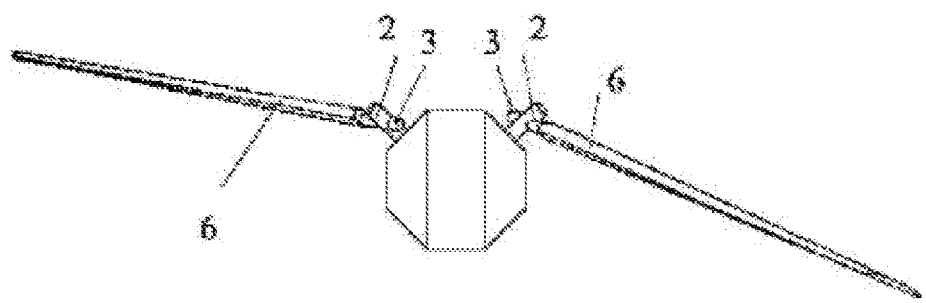
FIG. 2 is a front view of FIG. 1.
Figure 3:
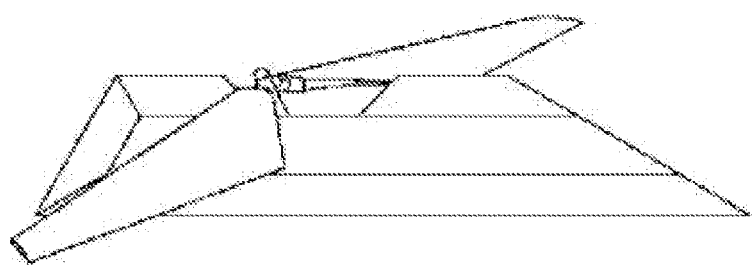
FIG. 3 is a side view of FIG. 1.
Figure 4:
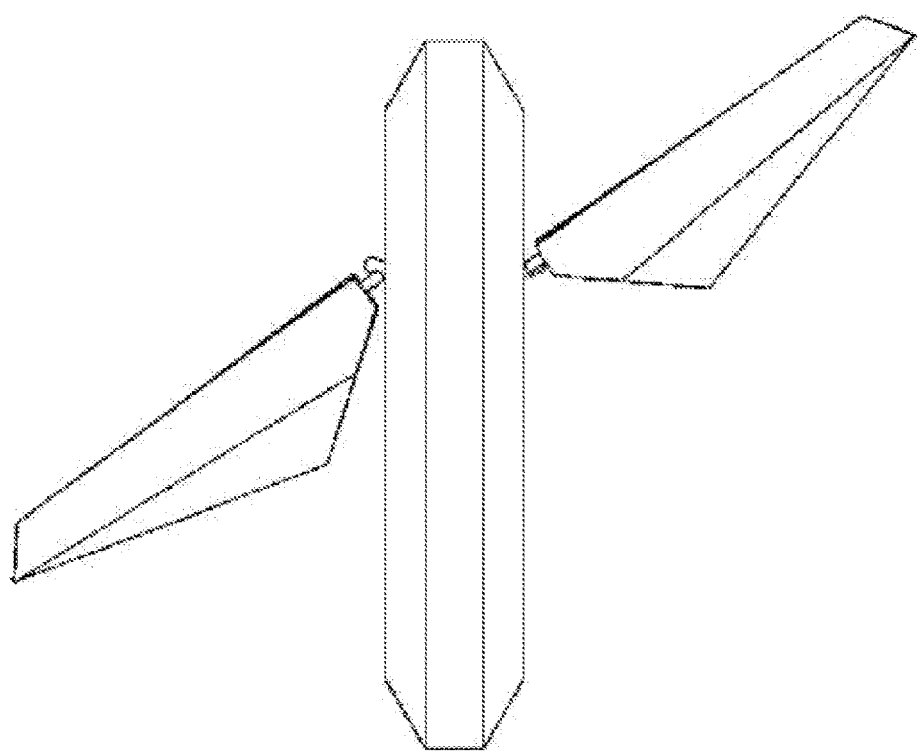
FIG. 4 is a bottom view of FIG. 1.
Figure 5:
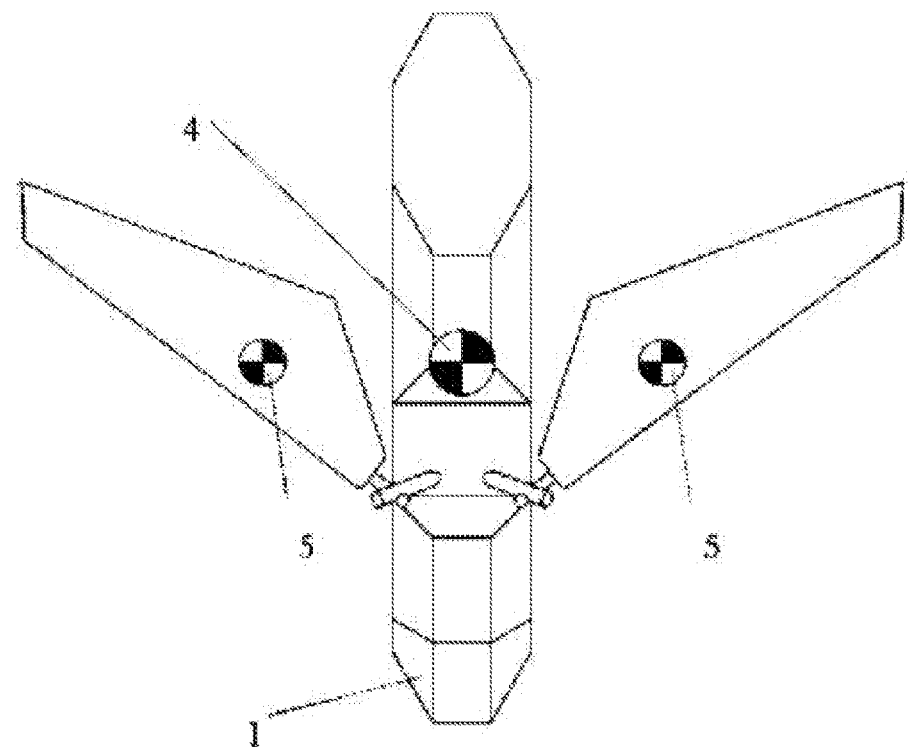
FIG. 5 is a plan view of the airframe coordinates of the airframe obtained by causing the shoulder rotational axes 2 and the arm rotational axes 3 to rotate in a bilaterally symmetric manner (to 55° and 30°, respectively) (first embodiment).
Figure 6:
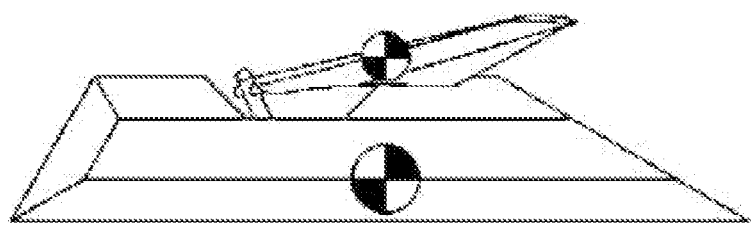
FIG. 6 is a side view of a spatial posture of the airframe that is horizontally flying in FIG. 5.
Figure 7:
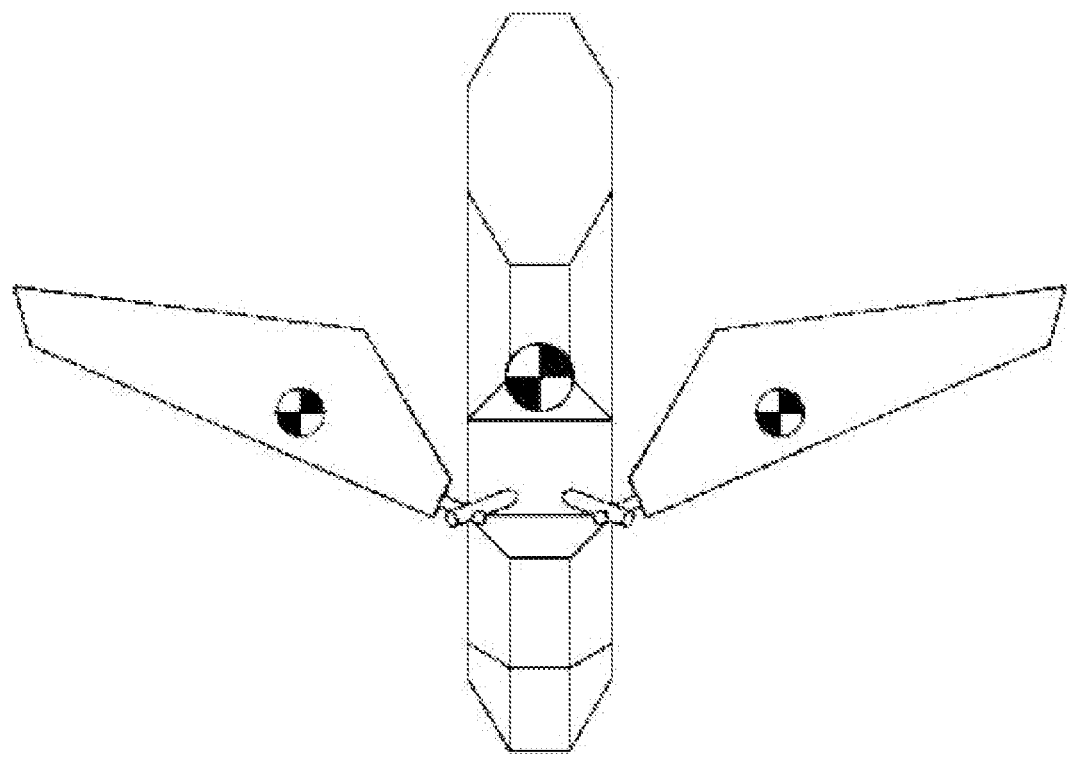
FIG. 7 is a plan view of the airframe coordinates of the airframe obtained by causing the shoulder rotational axes 2 and the arm rotational axes 3 to rotate in a bilaterally symmetric manner (to 33° and 52°, respectively) (first embodiment).
Figure 8:
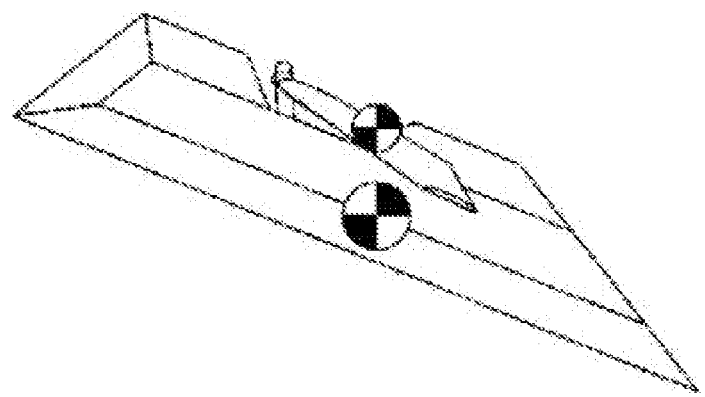
FIG. 8 is a side view of a spatial posture of the airframe with a nose lifted in FIG. 7.
Figure 9:
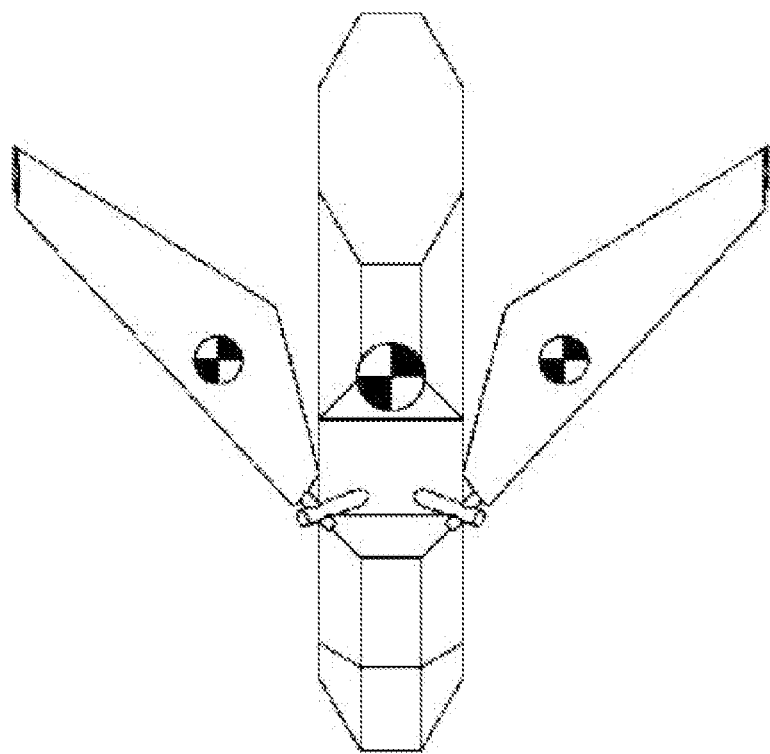
FIG. 9 is a plan view of the airframe coordinates of the airframe obtained by causing the shoulder rotational axes 2 and the arm rotational axes 3 to rotate in a bilaterally symmetric manner (to 75° and 0°, respectively) (first embodiment).
Figure 10:
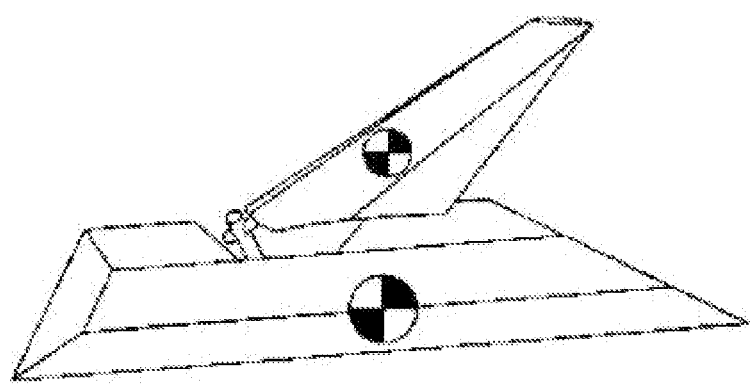
FIG. 10 is a side view of a spatial posture of the airframe with the nose lowered in FIG. 9.

FIGS. 5 and 6 are an airframe coordinate diagram illustrating a state of shoulder rotational axes 2 and arm rotational axes 3 when the airframe is horizontally flying and a diagram of a spatial posture thereof when the airframe is flying in the state. The airframe horizontally balances the airframe and horizontally flies by causing the shoulder rotational axes 2 to rotate and setting lift force points 5 on the left and right sides of the airframe and a gravity center 4 of the airframe at the same positions in airframe coordinates Z, and adjusts directions of lift forces at the lift force points 5 generated in the wings 6 by causing the arm rotational axes 3 to rotate.

FIGS. 7 to 10 are airframe coordinate diagrams illustrating a pitch control method of the airframe and diagrams of spatial postures thereof. Pitch control for lifting a nose is performed using an action, which is caused by causing the shoulder rotational axes 2 to rotate to move the lift force points 5 on both sides of the airframe to the front side of the airframe beyond the gravity center 4 of the airframe, in which the gravity center 4 of the airframe rotates using a straight line connecting both the lift force points 5 as an axis and tends to move and be stabilized below the straight line. Similarly, the nose is lowered by moving both the lift force points 5 to the rear side of the airframe beyond the gravity center 4 of the airframe.

Figure 11:
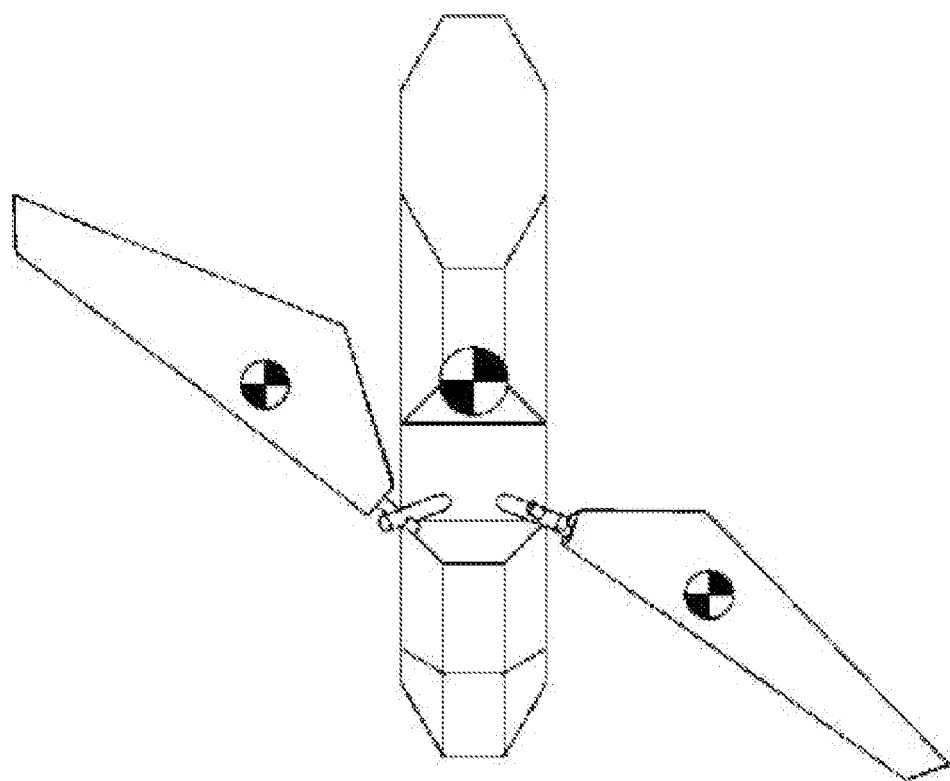
FIG. 11 is a plan view of the airframe coordinates of the airframe obtained by causing the shoulder rotational axes 2 to rotate in a bilaterally asymmetric manner (to 55° on the left side and to −35° on the right side) and causing the arm rotational axes 3 to rotate in a bilaterally symmetric manner (60°) (first embodiment).
Figure 12:
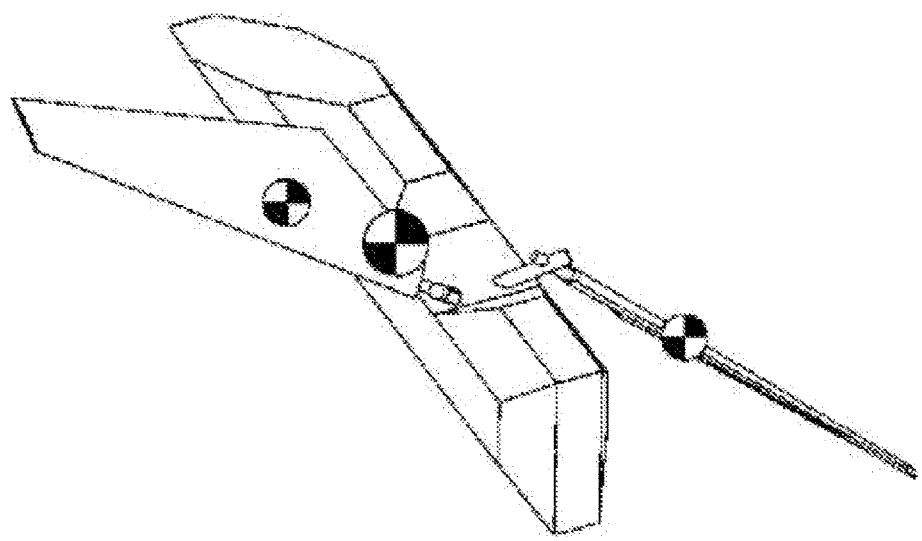
FIG. 12 is a plan view of a spatial posture of the airframe that is circling in FIG. 11.
Figure 13:
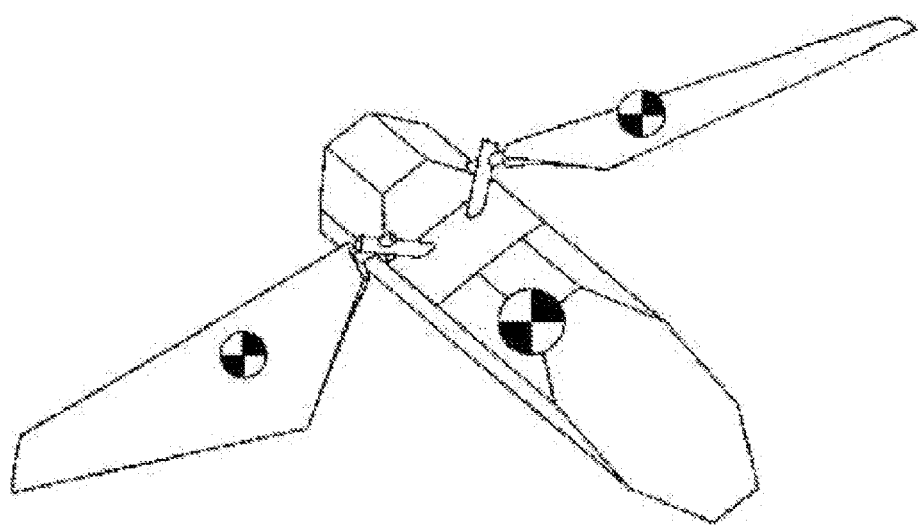
FIG. 13 is a back view of FIG. 12.

FIGS. 11 to 13 are an airframe coordinate diagram illustrating a circling control method of the airframe and diagrams of spatial postures thereof. A rotational angle of one of the two shoulder rotational axes 2, whichever is located on the inner side at the time of circling, is reduced relative to a rotational angle of another axis located on the outer side to move the lift force point 5 located on the inner side of the circling to the front side of the airframe beyond the lift force point 5 located on the outer side, creating an inclination of the straight line connecting both the lift force points 5 with respect to an X axis, Y axis, and Z axis of the airframe coordinates. At this time, two types of control, namely nose lifting control and rolling control are achieved by a stabilizing action caused when the gravity center 4 of the airframe rotates about an axis with the inclination and tends to move below the axis. In addition, circling occurs such that yaw axis rotation about the wings 6 is controlled when the wing 6 on the inner side of circling with an increased angle of attack is decelerated due to air resistance because the rotational angle of the shoulder rotational axis 2 is reduced.

Figure 14:
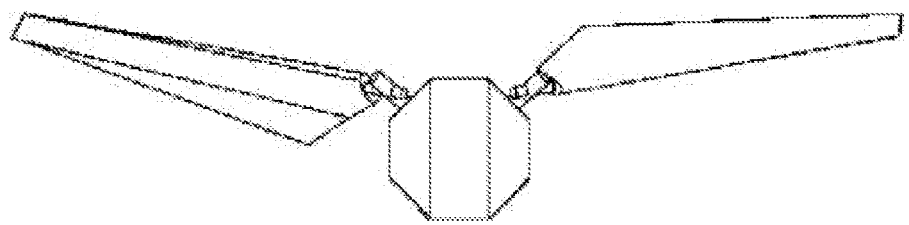
FIG. 14 is a front view of the airframe coordinates of the rolling airframe obtained by causing the shoulder rotational axes 2 to rotate in a bilaterally symmetric manner and causing the arm rotational axes 3 to rotate in a bilaterally asymmetric manner (first embodiment).
Figure 15:
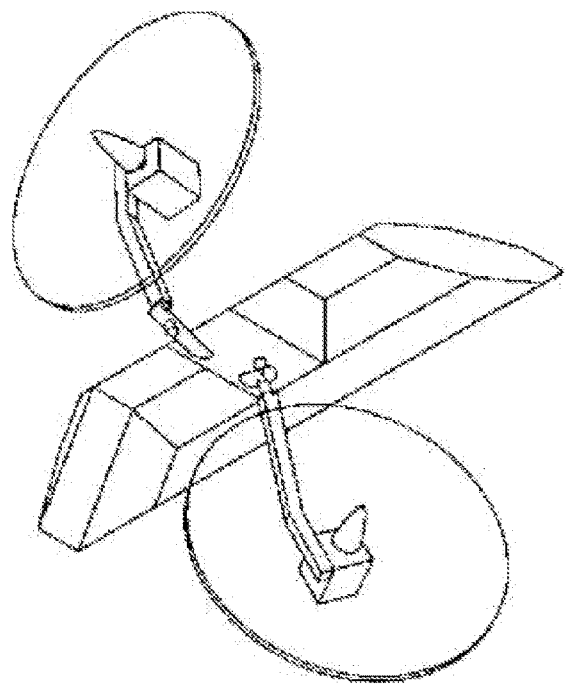
FIG. 15 is a perspective view of airframe coordinates of an airframe obtained by causing a shoulder rotational axis 2 on the left side to rotate to 45°, causing a shoulder rotational axis 2 on the right side to rotate to −35°, and causing both arm rotational axes 3 to rotate to 90° (second embodiment).
Figure 16:
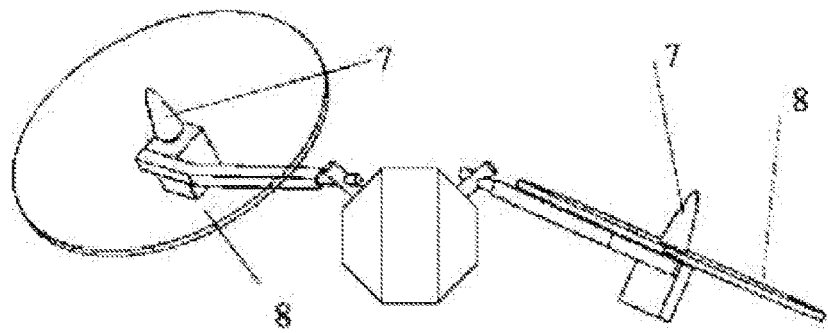
FIG. 16 is a front view of FIG. 15.
Figure 17:
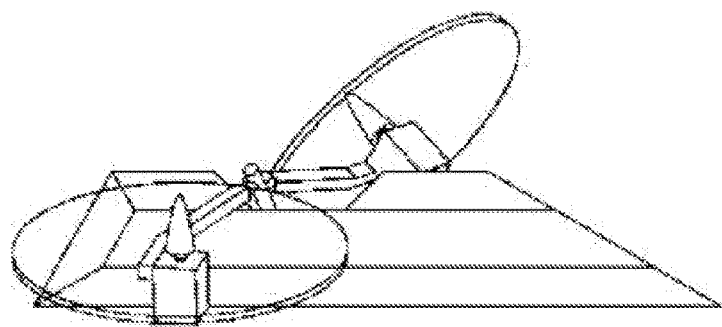
FIG. 17 is a side view of FIG. 15.

FIG. 14 is an airframe coordinate diagram illustrating a rolling control method of the airframe. Rolling control is performed by causing the arm rotational axes 3 to rotate in a bilaterally asymmetric manner and inclining the directions of the lift forces in a bilaterally asymmetric manner.

Second Embodiment

FIGS. 15 to 33 illustrate an aircraft of a vertical take-off and landing type that performs flight control by the method according to the present invention.

Figure 18:
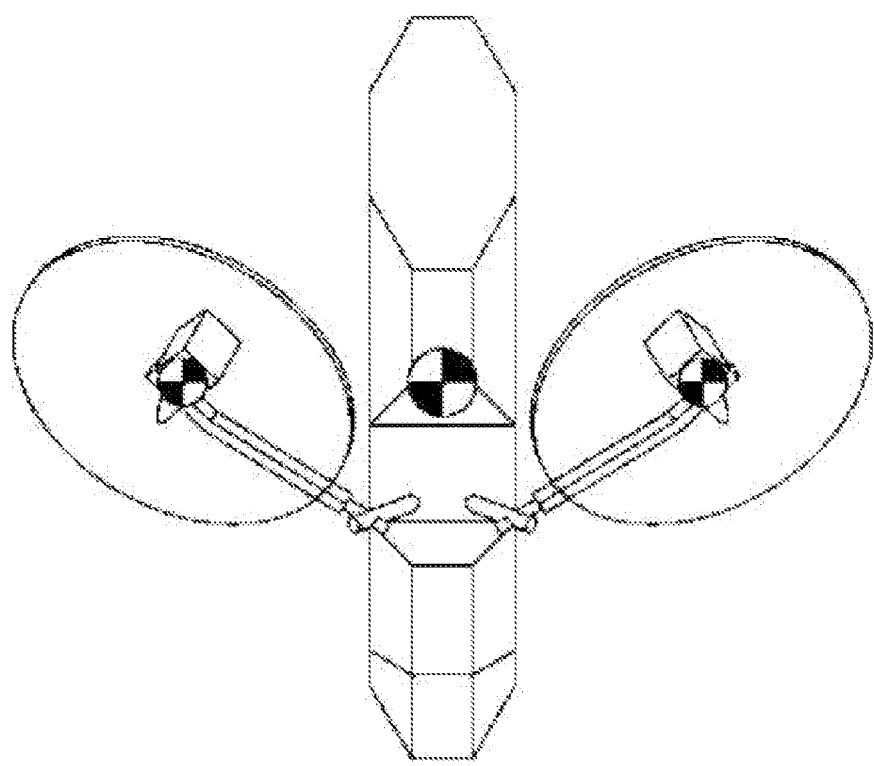
FIG. 18 is a plan view of the airframe coordinates of the airframe obtained by causing the shoulder rotational axes 2 and the arm rotational axes 3 to rotate in a bilaterally symmetric manner (to 45° and 90°, respectively) (second embodiment).
Figure 19:
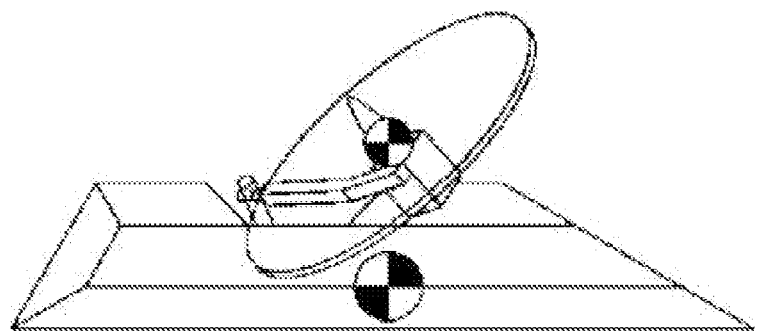
FIG. 19 is a side view of a spatial posture of the airframe that is horizontally flying in FIG. 18.
Figure 20:
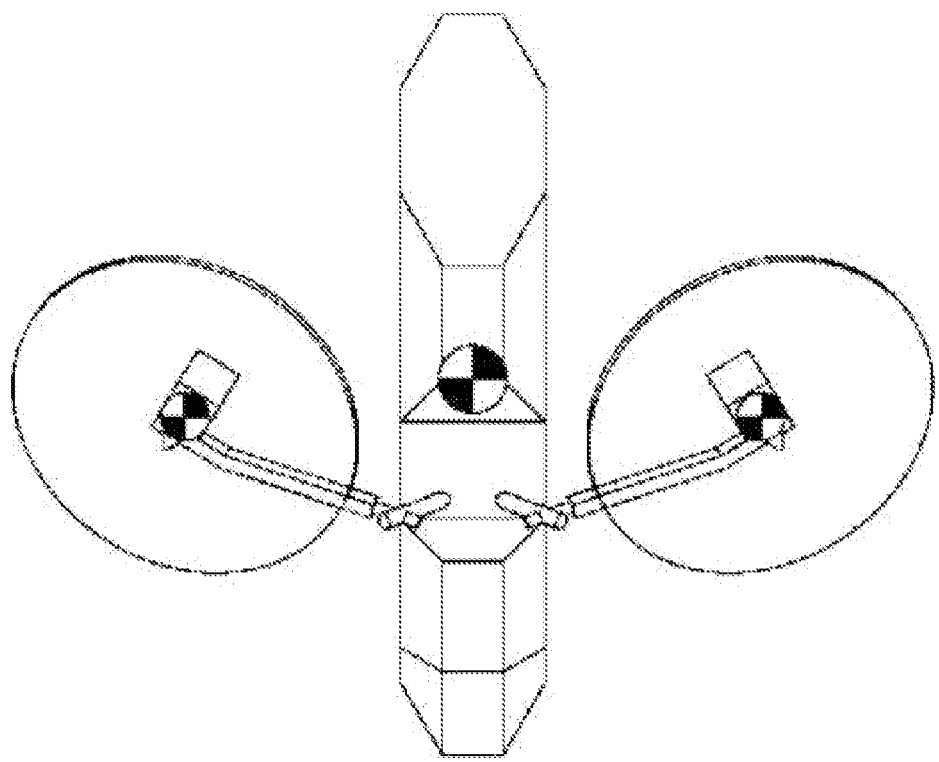
FIG. 20 is a plan view of the airframe coordinates of the airframe obtained by causing the shoulder rotational axes 2 and the arm rotational axes 3 to rotate in a bilaterally symmetric manner (to 25° and 90°, respectively) (second embodiment).
Figure 21:
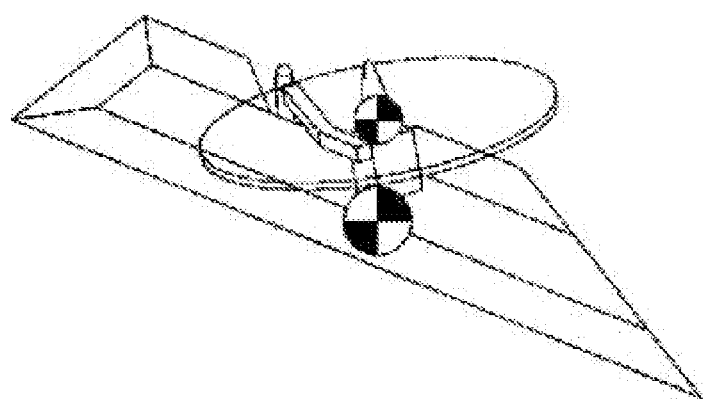
FIG. 21 is a side view of a spatial posture of the air frame with a nose lifted in FIG. 20.
Figure 22:
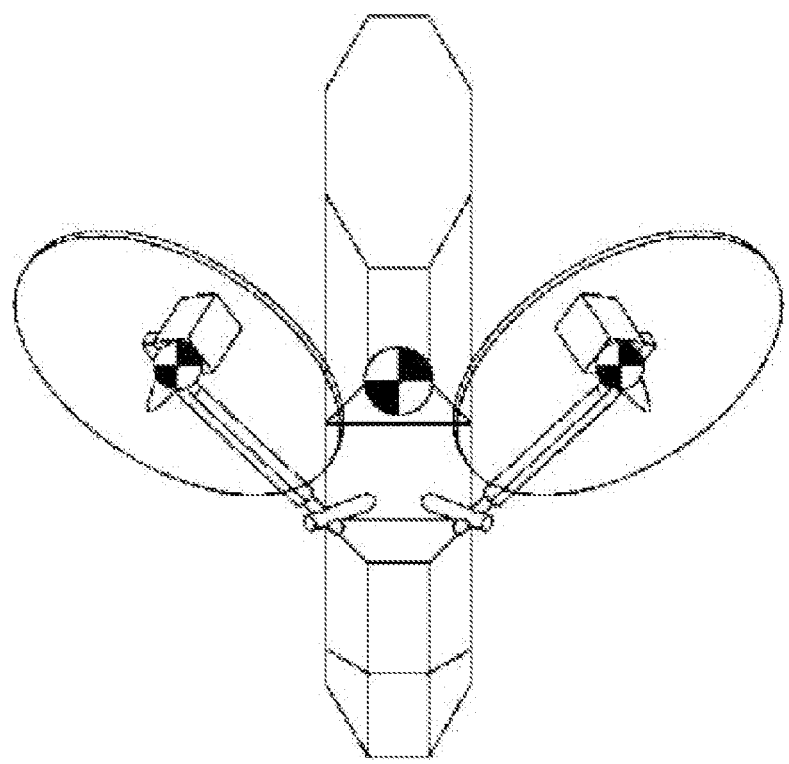
FIG. 22 is a plan view of the airframe coordinates of the airframe obtained by causing the shoulder rotational axes 2 and the arm rotational axes 3 to rotate in a bilaterally symmetric manner (to 65° and 90°, respectively) (second embodiment).
Figure 23:
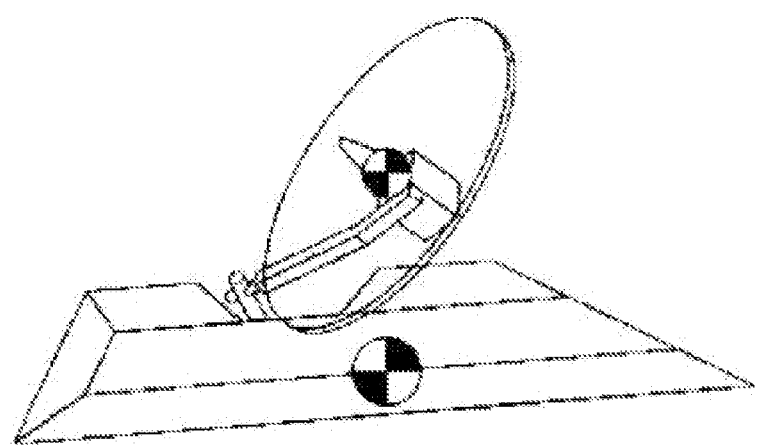
FIG. 23 is a side view of a spatial posture of the airframe with the nose lowered in FIG. 22.

FIGS. 18 and 19 are an airframe coordinate diagram of the airframe at the time of horizontal flight and a diagram of a spatial posture thereof. The second embodiment has no differences from the first embodiment in terms of the control method and is different from the first embodiment only in that a propeller rotation plane 8 is a lift force source of the airframe instead of the wings 6.

FIGS. 20 to 23 are airframe coordinate diagrams illustrating a pitch control method of the airframe and diagrams of spatial postures thereof. The control method is the same as that in the first embodiment.

Figure 24:
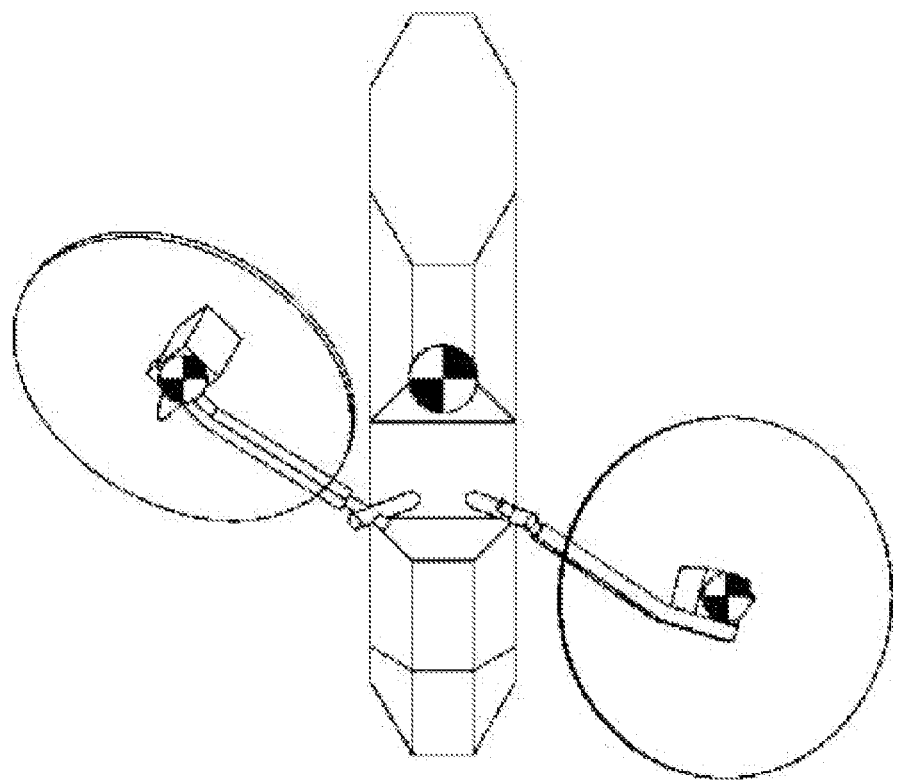
FIG. 24 is a plan view of the airframe coordinates of the airframe obtained by causing the shoulder rotational axes 2 to rotate in a bilaterally asymmetric manner (to 45° on the left side and to −35° on the right side) and causing the arm rotational axes 3 to rotate in a bilaterally symmetric manner (90°) (second embodiment).
Figure 25:
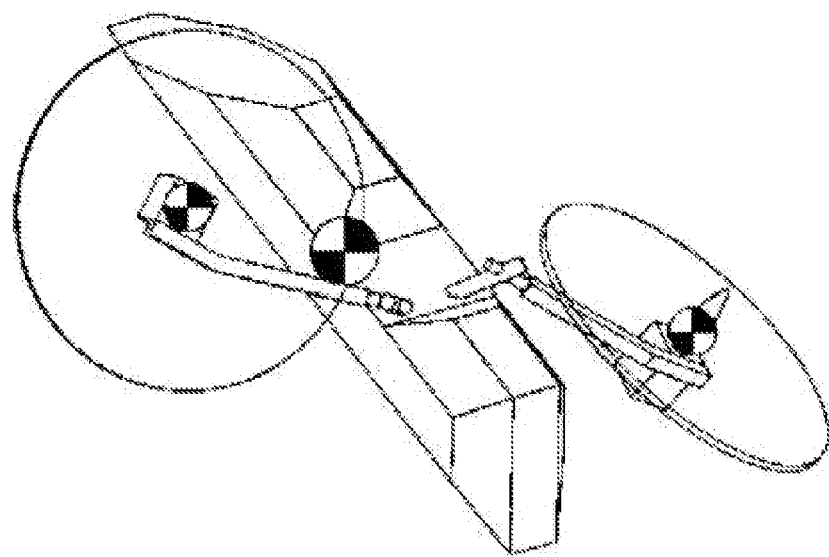
FIG. 25 is a plan view of a spatial posture of the airframe that is circling in FIG. 24.
Figure 26:
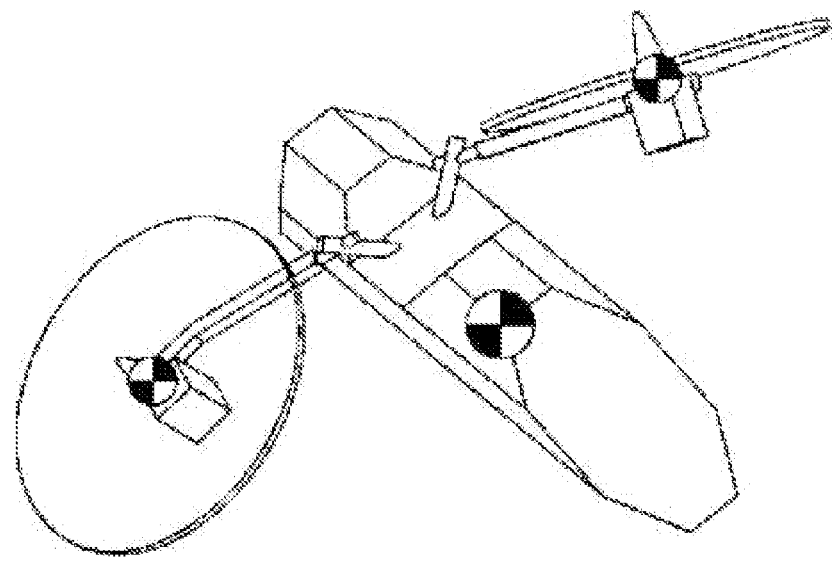
FIG. 26 is a back view of FIG. 25.

FIGS. 24 and 26 are an airframe coordinate diagram illustrating a circling control method of the airframe and diagrams of spatial postures thereof. This control method is the same as that in the first embodiment and is different therefrom only in that the propeller rotation plane 8 rather than the wings 6 is an air resistance source used to obtain yaw axis rotation of the airframe.

The rolling control method of the airframe is also the same as that in the first embodiment.

Figure 27:
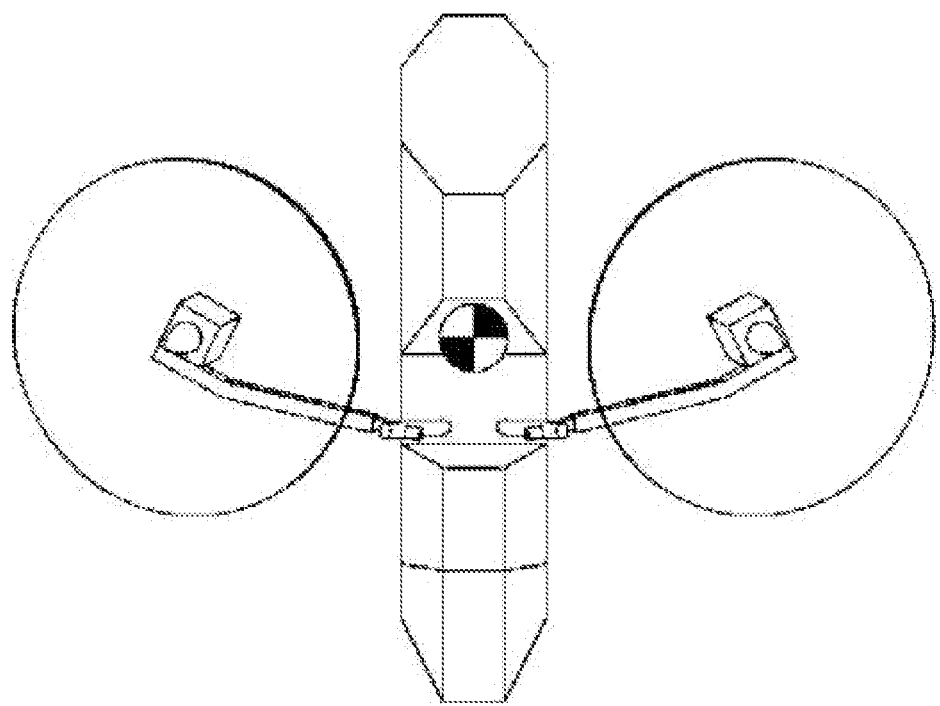
FIG. 27 is a diagram of a spatial posture of the airframe that is stopping in a space with the nose lifted, which is achieved by causing the shoulder rotational axes 2 and the arm rotational axes 3 to rotate in a bilaterally symmetric manner (to 25° and 90°, respectively) (second embodiment).

FIG. 27 is an airframe coordinate diagram when the airframe is stopping in a space with the nose lifted. This pitch control is also the same as that in the first embodiment.

Figure 28:
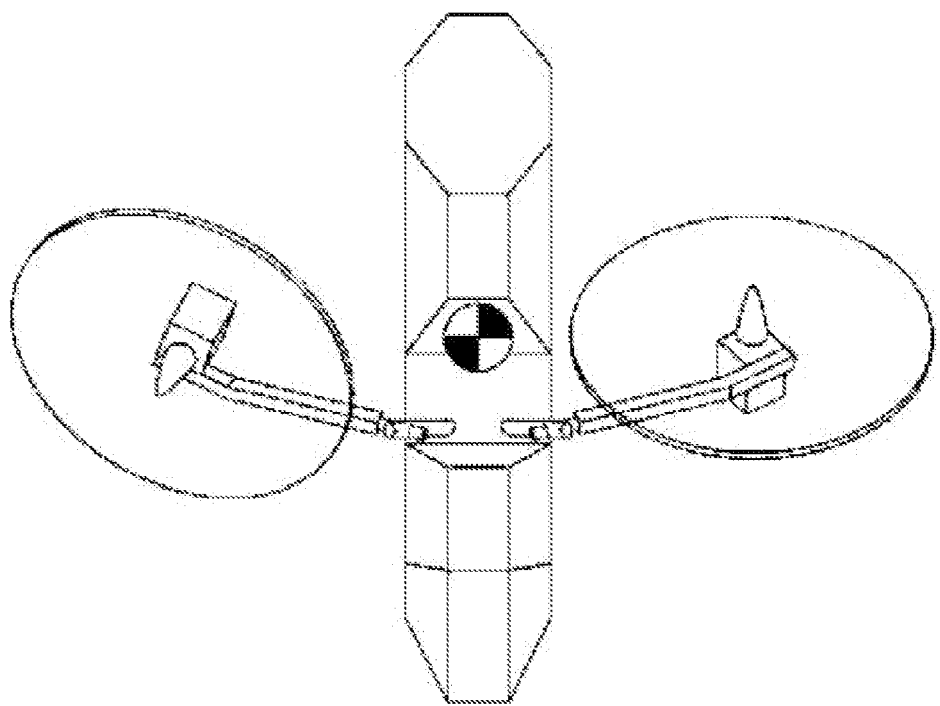
FIG. 28 is a plan view of a spatial posture of the airframe that is rotating about a yaw axis while stopping in a space with the nose lifted, which is achieved by causing the shoulder rotational axes 2 to rotate in a bilaterally symmetric manner and causing the arm rotational axes 3 to rotate in a bilaterally asymmetric manner (to 30° on the left side and to 120° on the right side) (second embodiment).

FIG. 28 is a diagram of a spatial posture when the airframe rotates about the yaw axis while stopping in the space with the nose lifted. The yaw axis rotation control about the airframe is performed by causing the arm rotational axes 3 to rotate in a bilaterally asymmetric manner and inclining the directions of the lift forces at the lift force points 5 in a bilaterally asymmetric manner.

Figure 29:
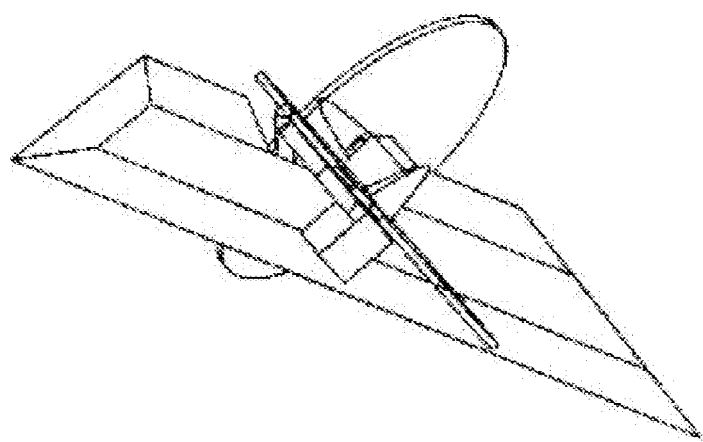
FIG. 29 is a side view of FIG. 28.

FIG. 29 is a side view of FIG. 28.

Figure 30:
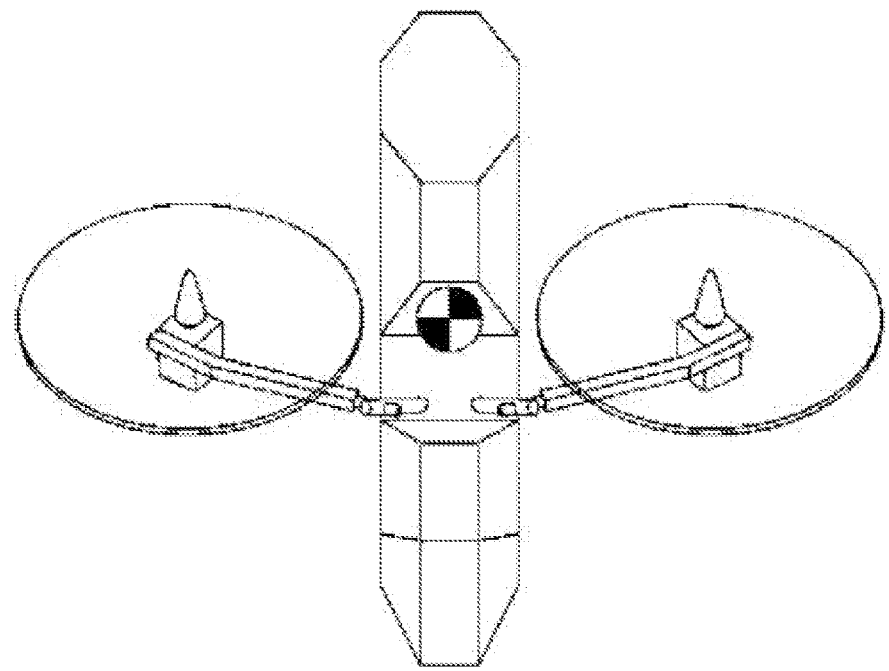
FIG. 30 is a plan view of a spatial posture of the airframe that is going backward while stopping in a space with the nose lifted, which is achieved by causing the shoulder rotational axes 2 and the arm rotational axes 3 to rotate in a bilaterally symmetric manner (to 25° and 120°, respectively) (second embodiment).

FIG. 30 is a diagram of a spatial posture when the airframe is going backward while stopping in a space with the nose lifted. The airframe goes back by causing the arm rotational axes 3 to rotate in a bilaterally symmetric manner and inclining the directions of the lift forces at both the lift force points 5 on the rear side of the airframe.

Figure 31:
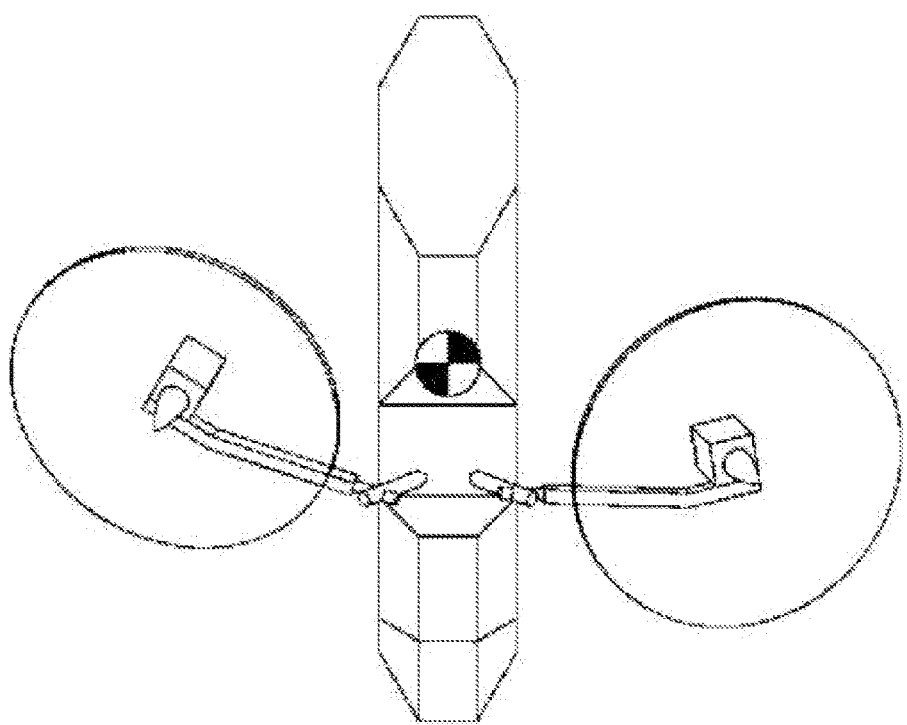
FIG. 31 is a plan view of the airframe coordinates of the airframe obtained by causing the shoulder rotational axes 2 to rotate in a bilaterally asymmetric manner (to 25° on the left side and to 0° on the right side) and causing the arm rotational axes 3 to rotate in a bilaterally symmetric manner (90°).

FIG. 31 is an airframe coordinate diagram when the airframe is moving in the lateral direction of the airframe while stopping in a space with the nose lifted. The rotational angle of the axis of the two shoulder rotational axes 2, whichever is located on the front side in an advancing direction at the time of lateral movement, is reduced relative to the other axis on the rear side to move the lift force point 5 located on the front side in the advancing direction to the front side of the airframe beyond the lift force point 5 on the rear side, creating an inclination of the straight line connecting both the lift force points 5 with respect to the X axis, the Y axis, and the Z axis of the airframe coordinates. At this time, nose lifting control and rolling control are achieved by a stabilizing action caused when the gravity center 4 of the airframe rotates about an axis with the inclination and tends to move below the axis. As a result, lateral movement occurs by using the inclination of the directions of the lift forces at the lift force points 5 in the lateral direction along with the airframe.

Figure 32:
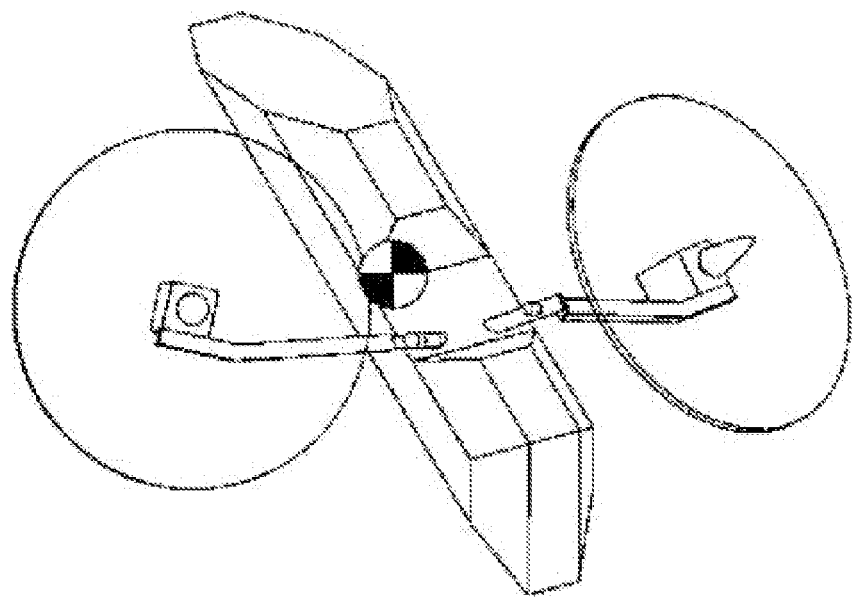
FIG. 32 is a plan view of a spatial posture of the airframe that is laterally moving while stopping in a space in FIG. 31 (second embodiment).
Figure 33:
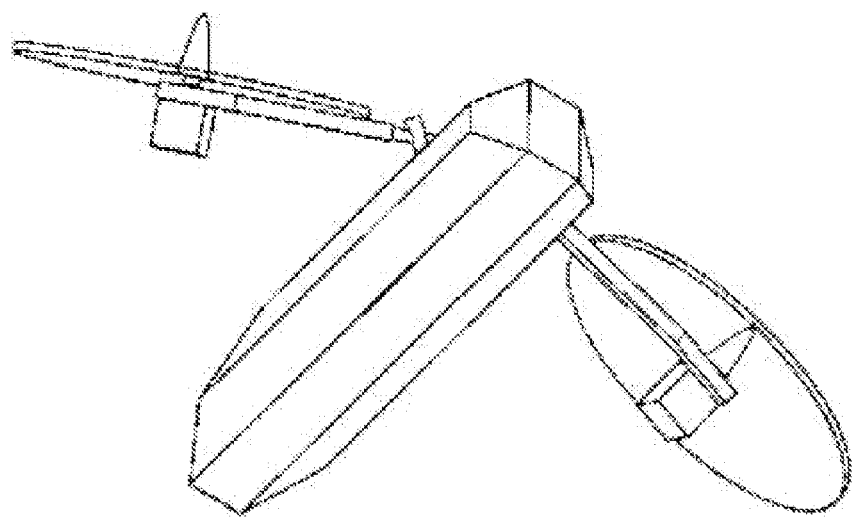
FIG. 33 is a front view of FIG. 32.

FIGS. 32 and 33 are diagrams of spatial postures in FIG. 31.

Third Example

Figure 34:
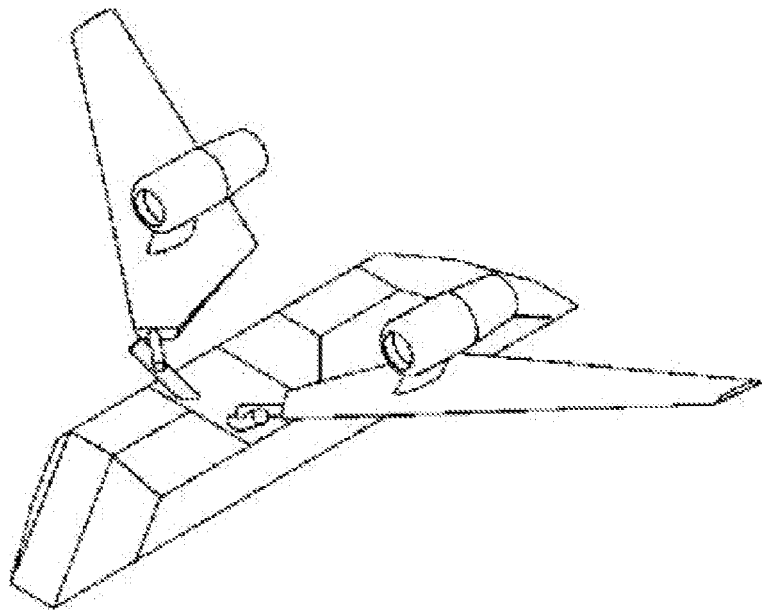
FIG. 34 is a perspective view of a spatial posture of an airframe that is horizontally flying (third embodiment).
Figure 35:
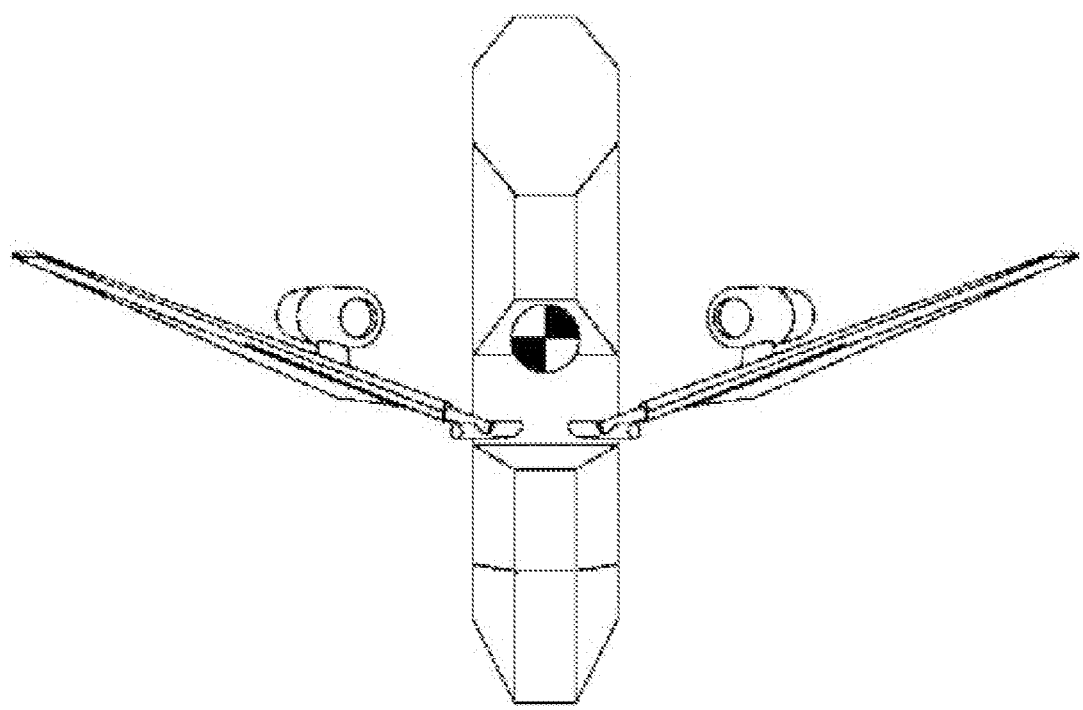
FIG. 35 is a plan view of a spatial posture of the airframe that is stopping in a space with a nose lifted (third embodiment).
Figure 36:
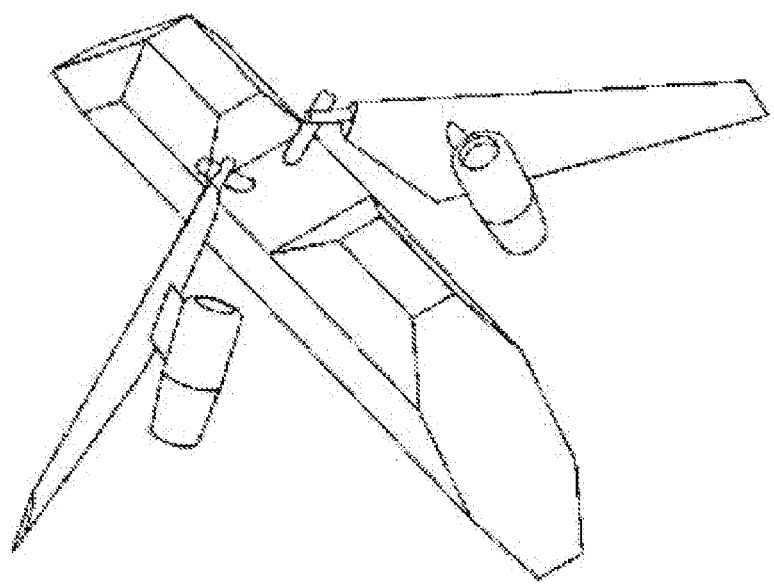
FIG. 36 is a perspective view of FIG. 35 (third embodiment).

FIGS. 34 to 36 illustrate a vertical take-off and landing aircraft that employs claim 2 of the present invention and includes jet engines on the wings 6. The flight control method of the airframe is the same as that in the second embodiment.

What is claimed is:

1. An aircraft control method, wherein when three-dimensional orthogonal coordinates represented by an XY plane having a Y axis as a vertical axis are used as airframe coordinates for an airframe front view of an aircraft, and (1) to (4) below are defined with reference to the airframe coordinates,
   (1) a shoulder rotational axis: an axis obtained by causing an upper portion of an axis that is parallel to the Y axis to rotate about a Z axis within a range of 45° to 60°, inclining the upper portion toward outside of the airframe, causing the upper portion to rotate about an X axis within a range of 20° to 35°, and inclining the upper portion in a nose direction of the airframe,
   (2) shoulder coordinates: orthogonal coordinates having the shoulder rotational axis as a Y axis passing through the origin,
   (3) arm rotational axis: an axis that is attached to the shoulder rotational axis, extends toward the outside of the airframe, is obtained by causing an axis that is parallel to an X axis of the shoulder coordinates to rotate about a Z axis of the shoulder coordinates within a range of 20° to 35° and inclining a further side of the axis in an upper direction of the airframe, and passes through shoulder coordinates Z=0,
   (4) lift force point: one point representing a lift force acting on one main wing on one side of the aircraft,
   one or more pairs of shoulder rotational axes and arm rotational axes are provided on left and right sides of the airframe of the aircraft, relative positions of lift force points generated by airframe lift force sources attached to the arm rotational axes with respect to the airframe are changed by causing the shoulder rotational axis to rotate, directions of lift forces generated at the lift force points are changed by causing the arm rotational axes to change, and the aircraft is controlled through combinations of the changes.

2. The method according to claim 1, wherein, in the three-dimensional orthogonal coordinates when the arm rotational axis passing through the shoulder coordinates Z=0 is defined as a first arm rotational axis, and when an arm rotational axis passing through the shoulder coordinates Z≠0 is defined as a second arm rotational axis, the second arm rotational axis is used instead of the first rotational axis.

* * * * *